(12) United States Patent
Fernandes et al.

(10) Patent No.: US 9,161,094 B2
(45) Date of Patent: *Oct. 13, 2015

(54) METHODS AND APPARATUS FOR BROADCAST AND MULTICAST/UNICAST TRANSITION

(71) Applicant: MOBITV, INC., Emeryville, CA (US)

(72) Inventors: Cedric Fernandes, San Ramon, CA (US); James Barnes, Alameda, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,829

(22) Filed: Jul. 17, 2013

(65) Prior Publication Data

US 2015/0026735 A1   Jan. 22, 2015

Related U.S. Application Data

(63) Continuation of application No. 13/091,050, filed on Apr. 20, 2011, now Pat. No. 8,514,824.

(51) Int. Cl.
| | |
|---|---|
| *H04N 21/647* | (2011.01) |
| *H04N 21/44* | (2011.01) |
| *H04N 21/61* | (2011.01) |
| *H04N 21/6405* | (2011.01) |

(Continued)

(52) U.S. Cl.
CPC ....... *H04N 21/647* (2013.01); *H04N 21/41407* (2013.01); *H04N 21/442* (2013.01); *H04N 21/44004* (2013.01); *H04N 21/44016* (2013.01); *H04N 21/6112* (2013.01); *H04N 21/6131* (2013.01); *H04N 21/6405* (2013.01); *H04N 21/6408* (2013.01); *H04N 21/8547* (2013.01); *H04W 4/06* (2013.01); *H04W 24/00* (2013.01); *H04W 36/14* (2013.01)

(58) Field of Classification Search
CPC .................................................... H04N 21/647
USPC ........................................................... 725/62
See application file for complete search history.

(56) References Cited

U.S. PATENT DOCUMENTS

| | | |
|---|---|---|
| 2008/0219326 A1 | 9/2008 | Santhoff |
| 2008/0304458 A1 | 12/2008 | Aghvami et al. |

(Continued)

FOREIGN PATENT DOCUMENTS

| | | |
|---|---|---|
| DE | 112012001769 T5 | 1/2014 |
| GB | 2508726 | 6/2014 |
| WO | 2012145229 | 10/2012 |

OTHER PUBLICATIONS

"International Application Serial No. PCT/US2012/033341, Search Report and Written Opinion mailed Jul. 17, 2012", 6 pgs.

(Continued)

*Primary Examiner* — Jefferey Harold
*Assistant Examiner* — Justin Sanders
(74) *Attorney, Agent, or Firm* — Kwan & Olynick LLP

(57) ABSTRACT

Mechanisms are provided for efficient transition between broadcast media reception and multicast/unicast media reception. Broadcast media quality is dynamically analyzed to determine when transition is appropriate. Broadcast services are mapped to multicast/unicast delivered services. Transition occurs smoothly by acquiring both broadcast and multicast/unicast media during transition and analyzing timing data to allow for media stream alignment and switchover.

20 Claims, 8 Drawing Sheets

(51) Int. Cl.
  *H04N 21/6408* (2011.01)
  *H04N 21/8547* (2011.01)
  *H04W 4/06* (2009.01)
  *H04N 21/414* (2011.01)
  *H04N 21/442* (2011.01)
  *H04W 24/00* (2009.01)
  *H04W 36/14* (2009.01)

(56) References Cited

U.S. PATENT DOCUMENTS

2009/0136156 A1* 5/2009 Farouki et al. ............... 382/284
2011/0002405 A1   1/2011 Raveendran
2011/0064049 A1   3/2011 Jeon et al.
2012/0269075 A1  10/2012 Fernandes et al.
2013/0254828 A1*  9/2013 Reimers et al. ............... 725/134
2013/0286868 A1* 10/2013 Oyman et al. ............... 370/252

OTHER PUBLICATIONS

U.S. Appl. No. 13/091,060, Non Final Office Action mailed Dec. 26, 2012.

"U.S. Appl. No. 13/091,050, Notice of Allowance mailed Apr. 17, 2013".

"Int'l Application Serial No. PCT/US2012/033341, Preliminary Report on Patentability mailed Oct. 31, 2013".

* cited by examiner

| Mapping Table 301 | Broadcast Channel Call Sign 303 | Multicast/Unicast Channel 305 |
|---|---|---|
| | Sign 313 | Channel 315 |
| | Sign 323 | Channel 325 |
| | Sign 333 | Channel 335 |

Figure 3

METHODS AND APPARATUS FOR BROADCAST AND MULTICAST/UNICAST TRANSITION

CROSS-REFERENCE TO RELATED APPLICATIONS

The present invention claims priority of pending U.S. patent application Ser. No. 13/091,050 filed Apr. 20, 2011, which is incorporated herein by reference in its entirety.

TECHNICAL FIELD

The present disclosure relates to transitioning between broadcast and multicast/unicast.

DESCRIPTION OF RELATED ART

Transmission technologies such as Advanced Television Systems Committee (ATSC), Digital Video Broadcasting (DVB), Integrated Services Digital Broadcasting (ISDB), and Digital Multimedia Broadcasting (DMB) provide broadcast media services over a large coverage area. Signals are often radiated from terrestrial transmitters or satellite transmitters to a variety of devices. However, broadcast transmission technologies are quite susceptible to factors such as interference and attenuation. Buildings, foliage, geography, etc., can all hinder delivery of broadcast signals.

Consequently, the techniques and mechanisms of the present invention provide a mechanism for improving media delivery to devices that receive broadcast media signals.

BRIEF DESCRIPTION OF THE DRAWINGS

The disclosure may best be understood by reference to the following description taken in conjunction with the accompanying drawings, which illustrate particular embodiments.

FIG. 3 illustrates one example mapping table.

DESCRIPTION OF EXAMPLE EMBODIMENTS

Figure 1:
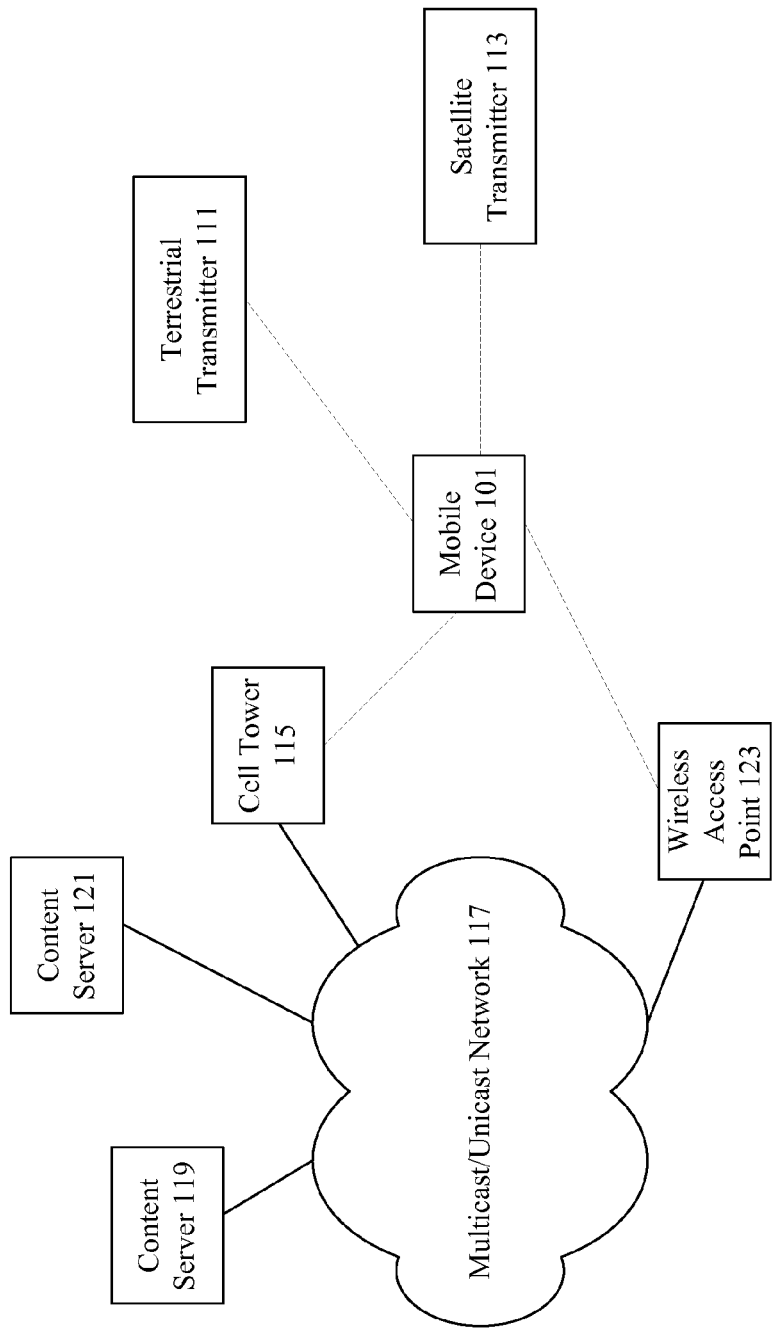
FIG. 1 illustrates one example of a broadcast and multicast/unicast system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular protocols. However, it should be noted that the techniques of the present invention apply to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for efficient transition between broadcast media reception and multicast/unicast media reception. Broadcast media quality is dynamically analyzed to determine when transition is appropriate. Broadcast services are mapped to multicast/unicast delivered services. Transition occurs smoothly by acquiring both broadcast and multicast/unicast media during transition and analyzing timing data to allow for media stream alignment and switchover.

EXAMPLE EMBODIMENTS

A variety of mechanisms are used to deliver media to devices. Broadcast technologies like ATSC, DVB, ISDB, and DMB provide wide area coverage. Signals are often radiated from terrestrial transmitters or satellite transmitters to a variety of receivers. However, broadcast transmission technologies are quite susceptible to factors such as interference and attenuation. Buildings, foliage, geography, etc., can all hinder delivery of broadcast signals. Broadcast technologies are inherently susceptible to signaling issues indoors or in areas without direct line of sight. As such, consumers often end up with a sub-optimal user experience due to lack of coverage or poor video quality.

The techniques of the present invention recognize that broadcast services can be supplemented with multicast/unicast media distribution services. For example, media distribution over mobile data networks or local wireless area networks can improve user experience. Mobile data networks such as cellular networks or wireless fidelity (WiFi) networks may have their own limitations such as limited bandwidth availability, latency, or coverage limitations, but these multicast/unicast media distributions provide coverage that can supplement broadcast media distribution coverage and enhance services. However, multicast/unicast services have a variety of challenges such as latency, server and client buffering.

Typically in the broadcast space, there is a correlation between signal strength and video quality. Many current systems evaluate signal to noise ratio, decibel (dB) levels, etc. to estimate the quality of the broadcast signal. However, this does not really provide an accurate reading or an estimate of the actual video quality rendered on the receiving device. According to various embodiments, video quality is evaluated by measuring pixelation, buffering/pausing, and bit rates. In particular embodiments, the transition system includes transition thresholds used to determine when hand-off to a multicast/unicast network is appropriate. In some examples, if the estimated video quality drops below a certain level for a given period of time (t1), an application may choose to hand-off video reception to a multicast or unicast network.

According to various embodiments, a transition system maps broadcast service to mulicast/unicast services. In particular embodiments, the transition system includes mapping of broadcast channels to individual channels delivered over an internet protocl (IP) network. This broadcast to multicast/unicast mapping allows a transition system to determine the correct channel when conducting the hand-off to or from a broadcast signal. According to various embodiments, broadcast services have call signs that are mapped to unique channel identifier (ID) values for multicast/unicast delivery over IP networks.

Once a hand-off decision is made, a transition application will acquire the correct content channel via multicast/unicast over IP and initiate playback on the device. In order to ensure a smooth transition, the signal acquisition over the multicast/unicast IP network is performed quickly and the content continues from the same position in the stream.

According to various embodiments, seamless transitioning is provided by simultaneously receiving broadcast and IP multicast/unicast content for a period of time prior to switchover after a transition threshold is reached. In particular embodiments, a content stream is acquired simultaneously via a broadcast receiver and an IP multicast/unicast receiver when the video quality drops below the acceptable level for a period×milliseconds (tx)

According to various embodiments, the transition application monitors timing information such as presentation time stamps (PTS) in an MPEG transport stream. In particular embodiments, the Presentation time stamp (PTS) is a meta-data field in an MPEG transport stream or MPEG program stream that is used to achieve synchronization separate video, audio, and subtitle streams presented on a device. The PTS may be given in units related to a program's overall clock reference, e.g. Program Clock Reference (PCR) or System Clock Reference (SCR), which is also transmitted in the transport stream or program stream.

At this time, the application monitors the PTS in the broadcast and IP multicast/unicast streams. An IP unicast stream may be separately requested when a transition threshold is reached. If the broadcast video quality continues to degrade or the transition threshold is reached for a period of time, then the transition application marks the PTS on the broadcast feed and initiates playback of the multicast/unicast feed at the same PTS.

In particular embodiments, the handoff event may result in a very small interruption (via a black screen or frame freze) due to the need to re-initialize the decoder during this handoff event. The experience of the hand-off event with initiation of playback of multicast or unicast video can occur in several manners.

In particular examples, the PTS of the broadcast stream occurs prior to multicast/unicast PTS but exists within the client-buffer before being rendered. In these examples, additional multicast/unicast information in buffer is discarded. The transition system switches to frames in the multicast/unicast stream. In some examples, an I-frame is selected as the first frame after a multicast/unicast transition. Decoder reinitialization may be required in some instances.

In other examples, the PTS of broadcast occurs prior to multicast/unicast PTS and does not overlap with the client-buffer or does not have sufficient remaining buffer. In these examples, a brief period of signal reacquisition may be entered to allow buffering of the multicast/unicast stream and alignment of media. According to various embodiments, this undesirable stage can be mitigated by ensuring that unicast PTS is slightly prior to broadcast PTS.

In still other examples, the PTS of the multicasi/unicast stream occurs prior to the PTS of the broadcast stream. In these examples, buffering of multicast/unicast data begins so that a switch can occur at an appropriate point in the broadcast stream.

Providing combined broadcast and multicast/unicast services provides extensive coverage in a variety of environments while enhancing user experience and limiting network resource usage.

FIG. 1 illustrates an example of a system that can use various embodiments of the present invention. According to various embodiments, a mobile device 101 includes multiple receivers for receiving both broadcast and multicast/unicast data. According to various embodiments, the mobile device 101 has a broadcast antenna such as a digital television (DTV) antenna for receiving over the air broadcast data and a cellular radio antenna for receiving cellular multicast/unicast data. In particular embodiments, broadcast signals are transmitted from a terrestrial transmitter 111 and/or from a satellite transmitter 113. Terrestrial transmitter 111 and satellite transmitter 113 provide broad coverage and high quality media streams where signals can be received. However, terrestrial and satellite transmitters may suffer from effects such as signal attenuation, interference, etc., from foliage, structures, weather, etc. Consequently, the techniques of the present invention supplement broadcast signals with multicast/unicast data such as data from IP networks delivered over cellular, mobile, WiFi, etc.

A device 101 connected to a multicast/unicast network 117 through a cell tower may enhance user experience. Cell towers 115 may provide coverage different than the coverage provided by terrestrial transmitter 111 and satellite transmitter 113. Cell signals also suffer from deleterious effects such as foliage, structures, etc., but may provide coverage different than that afforded by terrestrial and satellite transmitters because of different transmission sites, power levels, transmission frequencies, etc. However, bandwidth over cellular networks may be limited and/or costly, particularly for unicast transmission, and consequently it may be desirable to use broadcast networks when possible.

A multicast/unicast network 117 provides limited range and restricts mobility, but provide bandwidth and coverage in many indoor areas and supplement broadcast communications. A multicast/unicast network 117 may include streaming content servers 119 and 121 as well as wireless access points 123 for the mobile device 101. According to various embodiments, broadcast signals are used when available. If media quality from a broadcast signal degrades to a particular transition threshold, a device switches to a multicast/unicast network provided over a mobile or wireless local network. According to various embodiments, a device periodically checks media quality from a broadcast signal and switches from a multicast/unicast signal to a broadcast signal if the broadcast signal reaches a transition threshold and a corresponding channel is available.

Figure 2:
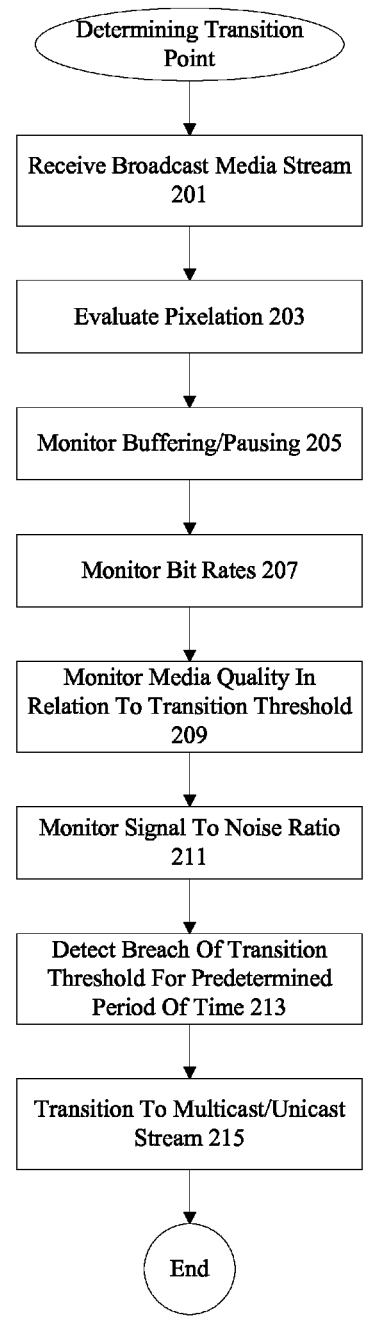
FIG. 2 illustrates one example of a technique for performing hand-off decision making.

FIG. 2 illustrates one example of a technique for determining a transition point. At 201, a broadcast media stream is received. According to various embodiments, media quality is estimated by evaluating pixelation at 203. Buffering/pausing is monitored at 205. Bit rates may be continuously monitored at 207. In particular embodiments, media quality is monitored in relation to a transition threshold at 209. In some examples, signal to noise ratio and dB levels can also be measured at 211.

According to various embodiments, if the pixelation falls below a certain level, buffering/pausing exceeds a predetermined period of time, or bit rates fall to an insufficient rate, a transition threshold is met. If the media quality falls beneath a predetermined transition threshold for a set period of time (t1) at 213, the process of transitioning to an alternate stream such as a multicast/unicast stream provided over an IP network is initiated at 215. According to various embodiments, the same techniques can be applied to transition from multicast/unicast to broadcast. In particular embodiments, a broadcast signal is monitored and if the broadcast signal provided media quality meeds or exceeds a transition threshold for a predetermined period of time, a device switches to broadcast stream regardless of multicast/unicast stream quality.

FIG. 3 illustrates one example of a mapping table. Mapping table 301 includes broadcast channel call signs 303 mapped to multicast/unicast IP delivered channels 305. In some examples, an exact match may not be available, and the closest content is delivered. According to various embodiments, call signs 313, 323, and 333 correspond to channels 315, 325, and 335 respectively. The mapping table 301 allows a transition system to determine a correct channel when conducting a hand-off from broadcast to multicast/unicast or from multicast/unicast to broadcast. In some examples, each broadcast channel has a unique call sign and the unique call sign is mapped to a unique channel ID values for multicast/unicast IP delivery.

Figure 4:
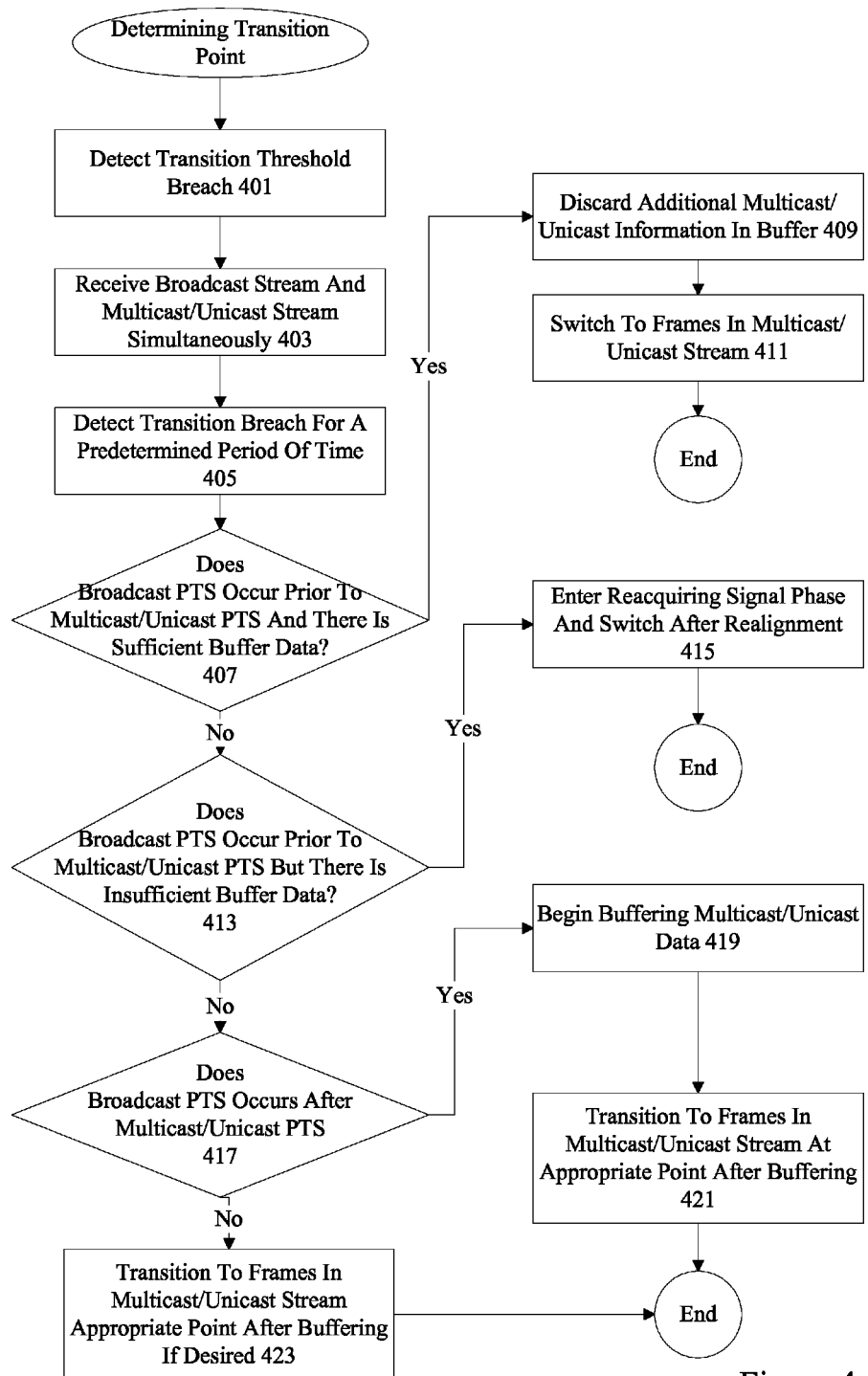
FIG. 4 illustrates one example of broadcast and multicast/unicast handoff.

FIG. 4 illustrates one example of a technique for media stream transition. Although a broadcast to unicast/multicast stream hand-off is described, it should be recognized that various embodiments can also be applied to unicast/multicast to broadcast hand-off. At 401, a transition threshold breach is detected. According to various embodiments, a broadcast stream and a multicast/unicast stream are received and simultaneously buffered at 403. In particular embodiments, this allows analysis of timing information of the two streams. According to various embodiments, PTS of the broadcast stream as well as PTS of the unicast/multicast stream are monitored. If the transition threshold breach continues for a predetermined period of time ty at 405, the transition system marks the PTS time on the broadcast feed to initiate playback of the multicast/unicast feed at the same PTS time.

According to various embodiments, if the PTS of the broadcast stream occurs prior to the multicast/unicast PTS but exists within the client-buffer before being rendered at 407, additional multicast/unicast information in the buffer is discarded at 409 and the transition system switches to frames in the multicast/unicast stream at 411. In particular embodiments, if the PTS of the broadcast stream occurs prior to the multicast/unicast PTS and does not overlap with the client-buffer or has insufficient remaining buffer at 413, the transition system enters a brief reacquiring signal buffering stage to realign the streams at 415 and a switch occurs after realignment. According to various embodiments, this situation is prevented by providing that the multicast/unicast PTS is slightly prior to the multicast PTS.

According to various embodiments, if the PTS of the multicast/unicast stream occurs prior to the PTS of the broadcast stream at 417, the device begins buffering multicast/unicast data at 419 so that the transition system can switch at the appropriate point in the broadcast stream at 421. If the PTS match exactly, transition can occur at any point at 423, although buffering may be desirable prior to transition.

Figure 5:
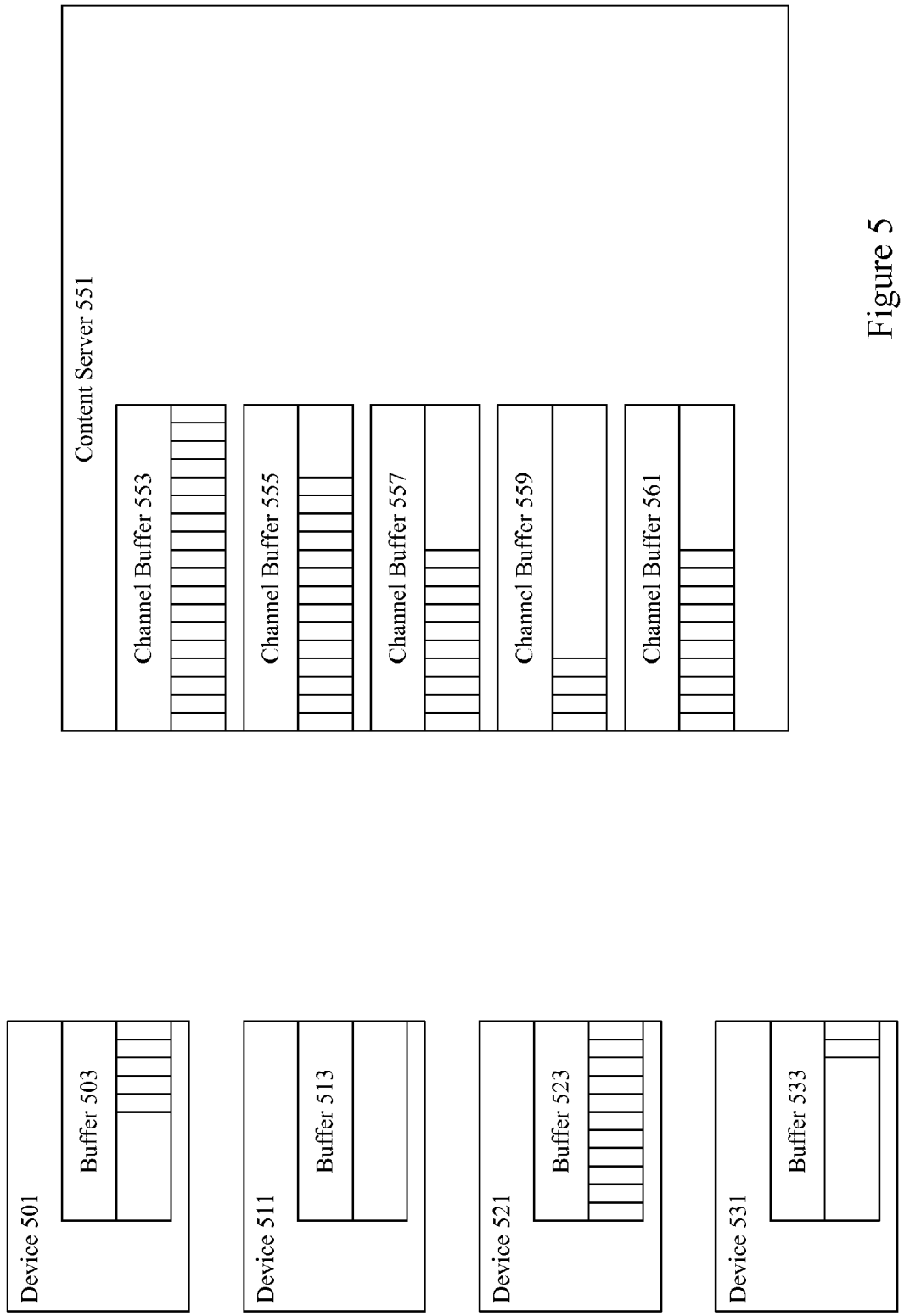
FIG. 5 illustrates one example of content server buffers.

FIG. 5 illustrates one example of content server buffers. According to various embodiments, devices 501, 511, 521, and 531 have individual buffers 503, 513, 523, and 533 for receiving unicast/multicast content. Content server 551 includes channel buffers 553, 555, 557, 559, and 561. In particular embodiments, a content server 551 detects that a device is transitioning from a broadcast to a unicast/multicast stream. A device such as a mobile device may have a buffer that reaches a transition threshold and a broadcast stream may no longer be sufficient. According to various embodiments, a content server may transmit a multicast/unicast stream to the device. In particular embodiments, to improve user experience, a content server 551 bursts available data for a requested unicast stream to a device 511 having empty buffer. In some examples, the content server 551 transmits data from channel buffer 555 to device 511 at double the usual transmission bit rate for a fixed number of seconds.

In other examples, the content server 551 transmits data from a low quality stream in channel buffer 553 to device 511. Transmitting a lower quality stream allows a buffer to be filled while maintaining the same transmission bit rate. For example, a stream in channel buffer 553 may be a 50 mbps stream while a stream in channel buffer 555 may be a 100 mbps stream. More frames from the lower quality stream can be transmitted to allow the device 511 to resume playback with decreased delay.

According to various embodiments, content server buffers may or may not be prefilled. In some examples, once a media stream has been requested, the corresponding channel buffer is filled at the content server. However, channel buffers corresponding to media streams not yet requested are typically not prefilled or prewarmed. Playback can be delayed while the content server channel buffers are filled. Consequently, the techniques and mechanisms of the present invention contemplate prefilling channel buffers. According to various embodiments, the content server channel buffers are prefilled using live streams from cable and satellite providers and continually refreshed with the most recent streaming data. In some instances, all channel buffers are prefilled. In other instances, selected channel buffers are prefilled and refreshed using satellite and cable media streams.

Figure 6:
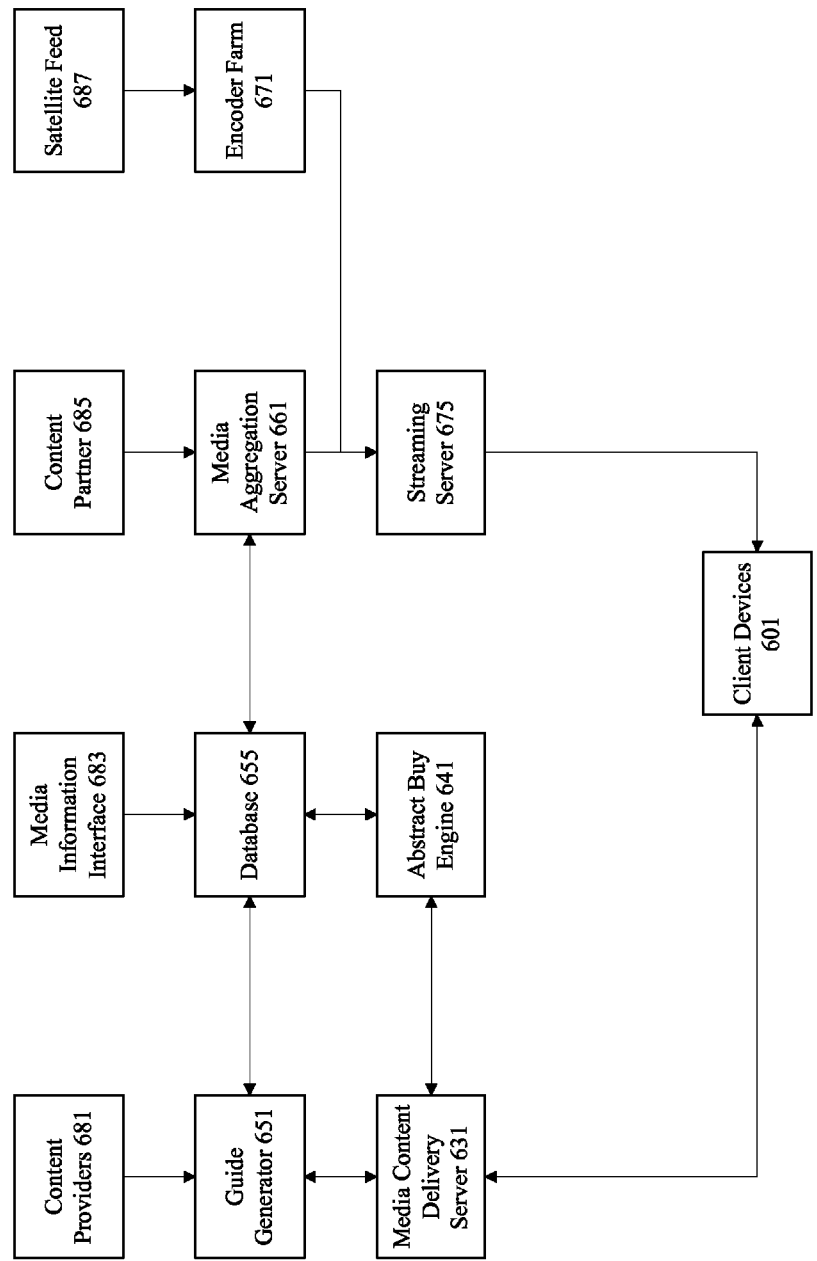
FIG. 6 illustrates one example of a multicast/unicast system.

FIG. 6 is a diagrammatic representation showing one example of a network that can use the techniques of the present invention. According to various embodiments, media content is provided from a number of different sources 685. Media content may be provided from film libraries, cable companies, movie and television studios, commercial and business users, etc. and maintained at a media aggregation server 661. Any mechanism for obtaining media content from a large number of sources in order to provide the media content to mobile devices in live broadcast streams is referred to herein as a media content aggregation server. The media content aggregation server 661 may be clusters of servers located in different data centers. According to various embodiments, content provided to a media aggregation server 661 is provided in a variety of different encoding formats with numerous video and audio codecs. Media content may also be provided via satellite feed 657. According to various embodiments, media content is categorized by using an IVSSE.

An encoder farm 671 is associated with the satellite feed 687 and can also be associated with media aggregation server 661. The encoder farm 671 can be used to process media content from satellite feed 687 as well as from media aggregation server 661 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 661 and encoder farm 671 is provided as live media to a streaming server 675. In one example, the streaming server is a Real Time Streaming Protocol (RTSP) server 675. Media streams are broadcast live from an RTSP server 675 to individual client devices 601. A variety of protocols can be used to send data to client devices.

Possible client devices 601 include personal digital assistants (PDAs), cellular phones, smartphones, personal computing devices, personal computers etc. According to various embodiments, the client devices are connected to a cellular network run by a cellular service provider. In other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 631. The media content delivery server 631 is configured to allow a client device 601 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 651. The guide generator 651 obtains information from disparate sources including content providers 681 and media information sources 683. The guide generator 651 provides program guides to database 655 as well as to media content delivery server 631 to provide to client devices 601.

According to various embodiments, the guide generator 651 obtains viewership information from individual client devices. In particular embodiments, the guide generation 651 compiles viewership information in real-time in order to generate a most-watched program guide listing most popular programs first and least popular programs last. The client device 601 can request program guide information and the most-watched program guide can be provided to the client device 601 to allow efficient selection of video content. According to various embodiments, guide generator 651 is connected to a media content delivery server 631 that is also associated with an abstract buy engine 641. The abstract buy engine 641 maintains subscription information associated with various client devices 601. For example, the abstract buy engine 641 tracks purchases of premium packages.

The media content delivery server 631 and the client devices 601 communicate using requests and responses. For example, the client device 601 can send a request to media content delivery server 631 for a subscription to premium content. According to various embodiments, the abstract buy engine 641 tracks the subscription request and the media content delivery server 631 provides a key to the client device 601 to allow it to decode live streamed media content. Similarly, the client device 601 can send a request to a media content delivery server 631 for a most-watched program guide for its particular program package. The media content delivery server 631 obtains the guide data from the guide generator 651 and associated database 655 and provides appropriate guide information to the client device 601.

Although the various devices such as the guide generator 651, database 655, media aggregation server 661, etc. are shown as separate entities, it should be appreciated that various devices may be incorporated onto a single server. Alternatively, each device may be embodied in multiple servers or clusters of servers. According to various embodiments, the guide generator 651, database 655, media aggregation server 661, encoder farm 671, media content delivery server 631, abstract buy engine 641, and streaming server 675 are included in an entity referred to herein as a media content delivery system.

Figure 7:
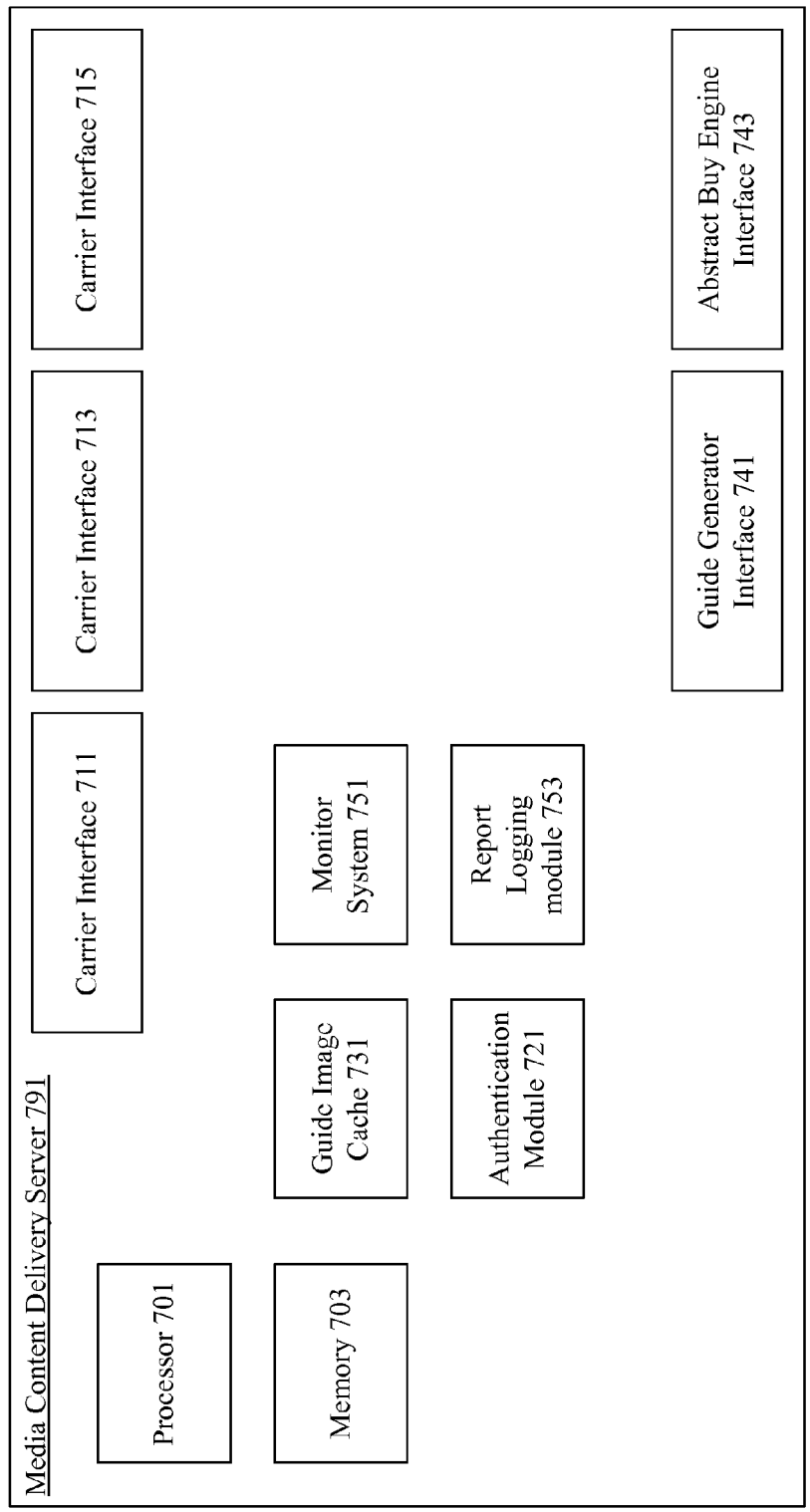
FIG. 7 illustrates one example of a content server.

FIG. 7 is a diagrammatic representation showing one example of a media content delivery server 791. According to various embodiments, the media content delivery server 791 includes a processor 701, memory 703, and a number of interfaces. In some examples, the interfaces include a guide generator interface 741 allowing the media content delivery server 791 to obtain program guide information. The media content delivery server 791 also can include a program guide cache 731 configured to store program guide information and data associated with various channels. The media content delivery server 791 can also maintain static information such as icons and menu pages. The interfaces also include a carrier interface 711 allowing operation with mobile devices such as cellular phones operating in a particular cellular network. The carrier interface allows a carrier vending system to update subscriptions. Carrier interfaces 713 and 715 allow operation with mobile devices operating in other wireless networks. An abstract buy engine interface 743 provides communication with an abstract buy engine that maintains subscription information.

An authentication module 721 verifies the identity of mobile devices. A logging and report generation module 753 tracks mobile device requests and associated responses. A monitor system 751 allows an administrator to view usage patterns and system availability. According to various embodiments, the media content delivery server 791 handles requests and responses for media content related transactions while a separate streaming server provides the actual media streams. In some instances, a media content delivery server 791 may also have access to a streaming server or operate as a proxy for a streaming server. But in other instances, a media content delivery server 791 does not need to have any interface to a streaming server. In typical instances, however, the media content delivery server 791 also provides some media streams. The media content delivery server 791 can also be configured to provide media clips and files to a user in a manner that supplements a streaming server.

Although a particular media content delivery server 791 is described, it should be recognized that a variety of alternative configurations are possible. For example, some modules such as a report and logging module 753 and a monitor 751 may not be needed on every server. Alternatively, the modules may be implemented on another device connected to the server. In another example, the server 791 may not include an interface to an abstract buy engine and may in fact include the abstract buy engine itself. A variety of configurations are possible.

Figure 8:
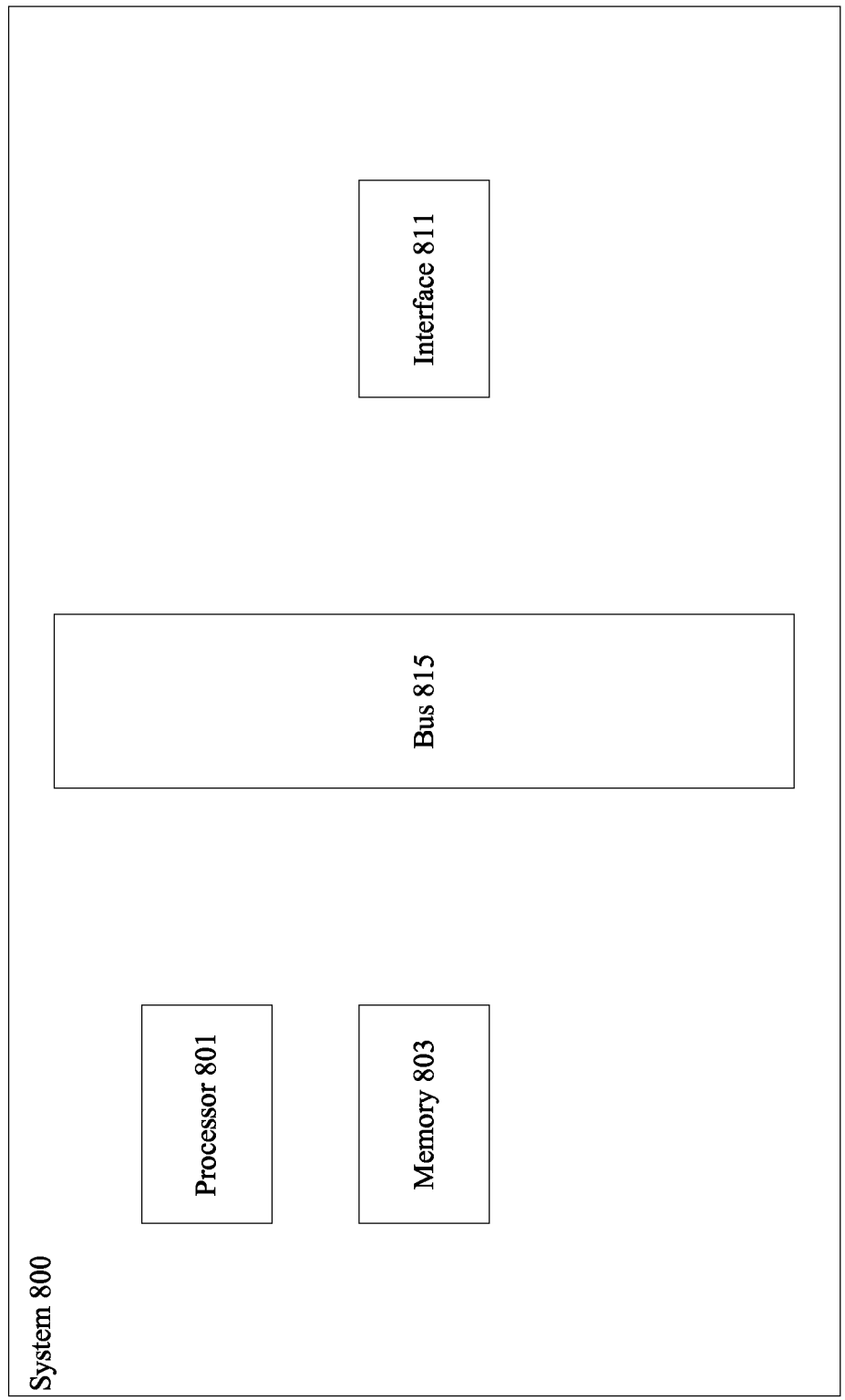
FIG. 8 illustrates one example of a computer system.

FIG. 8 illustrates one example of a system. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   receiving a broadcast media stream from a terrestrial transmitter using a broadcast media antenna on a mobile device;
   determining that the broadcast media stream no longer meets a quality threshold;
   receiving a multicast/unicast media stream on the mobile device over a wireless network, the wireless network delivering Internet Protocol (IP) data;
   monitoring timing information for the broadcast media stream and the multicast/unicast media stream;
   transitioning to the multicast/unicast media stream after aligning the broadcast media stream and the multicast/unicast media stream.

2. The method of claim 1, wherein the broadcast media stream no longer meets the quality threshold when pixelation reaches a predetermined level.

3. The method of claim 1, wherein the broadcast media stream no longer meets the quality threshold when buffering/pausing exceeds a predetermined period.

4. The method of claim 1, wherein the broadcast media stream no longer meets the quality threshold when bit rates fall below a predetermined level.

5. The method of claim 1, wherein the broadcast media stream no longer meets the quality threshold when a signal to noise ratio falls below a predetermined level.

6. The method of claim 1, wherein monitoring timing information comprises monitoring presentation time stamps (PTS) of the broadcast media stream and the multicast/unicast media stream.

7. The method of claim 6, wherein when a broadcast PTS occurs prior to a multicast/unicast PTS and there is sufficient buffer data, additional multicast/unicast data is discarded.

8. The method of claim 6, wherein when a broadcast PTS occurs prior to a multicast/unicast PTS and there is insufficient buffer data, a reacquiring signal phase is introduced.

9. The method of claim 6, wherein when a broadcast PTS occurs after a multicast/unicast PTS, multicast/unicast data is buffered and a transition occurs after sufficient buffering.

10. A system comprising:
    a broadcast media antenna on a mobile device configured to receive a broadcast media stream from a terrestrial transmitter;
    a processor configured to determine that the broadcast media stream no longer meets a quality threshold;
    an Internet Protocol (IP) interface configured to receive a multicast/unicast media stream on the mobile device over a wireless network, the wireless network delivering Internet Protocol (IP) data, wherein the processor monitors timing information for the broadcast media stream and the multicast/unicast media stream and transitions to the multicast/unicast media stream after aligning the broadcast media stream and the multicast/unicast media stream.

11. The system of claim 10, wherein the broadcast media stream no longer meets the quality threshold when pixelation reaches a predetermined level.

12. The system of claim 10, wherein the broadcast media stream no longer meets the quality threshold when buffering/pausing exceeds a predetermined period.

13. The system of claim 10, wherein the broadcast media stream no longer meets the quality threshold when bit rates fall below a predetermined level.

14. The system of claim 10, wherein the broadcast media stream no longer meets the quality threshold when a signal to noise ratio falls below a predetermined level.

15. The system of claim 10, wherein monitoring timing information comprises monitoring presentation time stamps (PTS) of the broadcast media stream and the multicast/unicast media stream.

16. The system of claim 15, wherein when a broadcast PTS occurs prior to a multicast/unicast PTS and there is sufficient buffer data, additional multicast/unicast data is discarded.

17. The system of claim 15, wherein when a broadcast PTS occurs prior to a multicast/unicast PTS and there is insufficient buffer data, a reacquiring signal phase is introduced.

18. The system of claim 15, wherein when a broadcast PTS occurs after a multicast/unicast PTS, multicast/unicast data is buffered and a transition occurs after sufficient buffering.

19. A non-transitory computer readable medium comprising:
- computer code for receiving a broadcast media stream from a terrestrial transmitter using a broadcast antenna on a mobile device;
- computer code for determining that the broadcast media stream no longer meets a quality threshold;
- computer code for receiving a multicast/unicast media stream on the mobile device over a wireless network, the wireless network delivering Internet Protocol (IP) data;
- computer code for monitoring timing information for the broadcast media stream and the multicast/unicast media stream;
- computer code for transitioning to the multicast/unicast media stream after aligning the broadcast media stream and the multicast/unicast media stream.

20. The computer readable medium of claim 19, wherein the broadcast media stream no longer meets the quality threshold when pixelation reaches a predetermined level.

* * * * *